United States Patent [19]
Wright

[11] 3,873,466
[45] Mar. 25, 1975

[54] STABILISATION OF FATS AND OILS WITH PHENOLIC ANTIOXIDANTS
[75] Inventor: Ronald Barrie Wright, Stockton-on-Tees, England
[73] Assignee: Imperial Chemical Industries Limited, London, England
[22] Filed: Sept. 5, 1972
[21] Appl. No.: 286,137

[30] Foreign Application Priority Data
Sept. 17, 1971 United Kingdom............ 43439/71

[52] U.S. Cl............... 252/404, 252/406, 260/398.5, 426/183, 426/197, 426/268, 426/269, 426/328
[51] Int. Cl............... C11b 5/00, A23d 5/04
[58] Field of Search............ 252/404, 406; 426/183, 426/197, 268, 328, 269; 260/398.5

[56] References Cited
UNITED STATES PATENTS
| | | |
|---|---|---|
| 2,397,976 | 4/1946 | O'Leary............................ 426/197 |
| 2,679,459 | 5/1954 | Rosenwald......................... 426/183 |
| 2,908,718 | 10/1959 | Rosenwald......................... 252/404 |
| 2,981,628 | 4/1961 | Hall.................................. 252/404 |
| 2,999,841 | 12/1961 | Csendes............................. 252/404 |
| 3,523,083 | 8/1970 | De Pierri.......................... 252/404 |
| 3,594,318 | 7/1971 | O'Neill............................... 426/197 |

Primary Examiner—Benjamin R. Padgett
Assistant Examiner—Irwin Gluck
Attorney, Agent, or Firm—Cushman, Darby & Cushman

[57] ABSTRACT

Certain phenolic compounds, including 4-methoxy-2,6-di-tert.butyl phenol, show synergism with certain thio dialkanoic acid esters and metal deactivating acids in stabilising edible oils and fats.

10 Claims, No Drawings

STABILISATION OF FATS AND OILS WITH PHENOLIC ANTIOXIDANTS

This invention relates to the stabilisation of fats and oils.

The invention comprises a composition for stabilising fats and oils which comprises:

i. a phenolic compound of formula

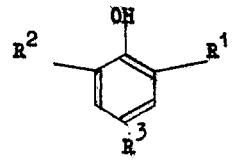

in which $R^1$ is a tertiary alkyl group having 4 to 18 carbon atoms and preferably 4 to 8 carbon atoms, and is more preferably a tertiary butyl group, $R^2$ is a hydrogen atom or a tertiary alkyl group having 4 to 18, and preferably 4 to 8, carbon atoms and is more preferably a tertiary butyl group and $R^3$ is a methyl, ethyl, methoxy or $-CH_2OH$ group and, if $R^3$ is $-CH_2OH$ or $CH_3O-$ and $R^1$ and $R^2$ are tertiary alkyl groups a compound selected from group (ii) or group (iii) and preferably a compound from each of groups (ii) and (iii) and, in the case of other compounds of group (i) a compound from each of groups (ii) and (iii) in which group (ii) is a thio di-alkanoic acid ester of formula:

$$R^4OOCC_pH_{2p}SC_qH_{2q}COOR^5$$

in which $p$ and $q$ are integers in the range 1 to 6, and preferably 2 or 3, and $R^4$ and $R^5$ are aliphatic hydrocarbon groups having 6 to 20, and preferably 12 to 18, carbon atoms, (these are suitably alkyl groups, examples of such di-esters are dilauryl and distearyl thio diproprionates and lauryl stearyl thio dipropionate), and in which group (iii) is a metal deactivating acid, for example citric acid, tartaric acid, ethylenediamine tetraacetic acid, ortho-, meta- or pyro-phosphoric acid, gluconic acid or malic acid, or salts thereof of which the cations are of negligible toxicity and exist in only one valency state, for example, lithium, strontium, sodium, potassium, magnesium or preferably calcium salts.

The invention also comprises edible oils and fats stabilised with a stabilising amount of a composition as aforesaid. Such oils and fats may be components of more complex foods, for example, potato crisps, biscuits and pastry.

It is preferred in compositions according to the invention that component (ii) and/or component (iii) should be present in ratios of between 10 : 1 and 1 : 10 parts by weight based on the weight of component (i). Component (i) is preferably present in fats and oils in a concentration of 10 to 5,000, and preferably 50 to 1,000 parts per million by weight.

Edible oils and fats which are stabilised in the present invention include animal and vegetable fats and oils, especially vegetable oils, for example, soyabean oil, rape seed oil and arachis oil.

EXAMPLE 1

200 g. aliquots of refined, deodorised soyabean oil (which had the following initial analysis: free fatty acid content 0.12 percent by weight expressed as oleic acid equivalent; peroxide value 7.4 meq. peroxide oxygen/kg.oil; Iodine number 136g. $I_2/100$ g. oil) was mixed with the appropriate quantity of the compounds shown in Table 1 and the resultant solution divided into four equal portions which were then stored in loosely-capped glass bottles at 40°C. At intervals representative samples (approximately 0.5 g.) were withdrawn and their peroxide value determined. From these results the time taken for the peroxide content to attain a value of 100 meq/kg. was estimated. 100 days after the start of the experiment additional samples were taken for the determination of free fatty acid content and iodine number. In Table 1 the values shown are the averages of the individual determinations for each composition. Peroxide values were determined by iodimetry and fatty acid contents by titration.

For those systems containing two (or more) additives the storage stability is calculated by adding to the observed storage stability achieved with 200 p.p.m. 4-methoxy-2,6-di-tert.butyl phenol alone (vix. 40 days), the difference between the observed storage life of the uninhibited oil (22 days) and the oil treated with the other additive(s). The triple systems K and L can be considered also as being respectively equivalent to systems G and H with the addition of 200 p.p.m. dilauryl thiodipropionate (system D). On this basis the calculated stability of system K is 71½ days which is a difference of 47½ days from the observed stability; for system L the corresponding calculated stability is 68½ days which represents a difference of 29 days.

It will be seen that in all cases of the use of dilauryl thiodipropionate and/or a metal deactivating acid (citric/maleic acid) in conjunction with 4-methoxy-2,6-di-tert.butyl phenol greatly improves the storage stability of soyabean oil. Confirmation that this is a true inhibition of peroxidation and is not the result of accelerated decomposition of peroxides as they are formed is shown by the fact that the increase in the free fatty acid content and the decrease in iodine number are significantly less in the binary (and especially ternary) systems.

TABLE 1

| System References | Additive Concentration p.p.m. by weight | | | | Storage Stability Time (days) to attain 100 meq/kg Peroxide oxygen | | | Change after 100 days | |
|---|---|---|---|---|---|---|---|---|---|
| | 4-Methoxy 2,6-di- tert. butyl phenol | Dilauryl Thiodipropionate | Citric Acid | Malic Acid | Observed | Calculated | Difference | Free fatty acid increase % by weight as oleic acid | Iodine No. decrease g.$I_2$/100g |
| A | Nil | Nil | Nil | Nil | 22 | — | — | 0.27 | 5 |
| B | 200 | Nil | Nil | Nil | 40 | — | — | 0.15 | 2 |
| C | Nil | 100 | Nil | Nil | 25½ | — | — | 0.22 | 4 |
| D | Nil | 200 | Nil | Nil | 28½ | — | — | 0.20 | 9 |
| E | Nil | Nil | 100 | Nil | 21 | — | — | 0.26 | 7 |
| F | Nil | Nil | Nil | 100 | 22 | — | — | 0.20 | 4 |
| G | 200 | 100 | Nil | Nil | 76 | 43½ | 32½ | 0.09 | 1 |
| H | 200 | Nil | Nil | 100 | 65 | 39 | 26 | 0.10 | 2 |
| J | 200 | Nil | 100 | Nil | 62 | 40 | 22 | 0.13 | 2 |
| K | 200 | 200 | 100 | Nil | 119 | 45½ | 73½ | 0.06 | 1 |
| L | 200 | 200 | Nil | 100 | 97½ | 46½ | 51 | 0.06 | ½ |

EXAMPLE 2

200 g. Aliquots of refined deodurised rape-seed oil (which had the following initial analysis: free fatty acid content 0.12 percent by weight expressed as oleic acid equivalent; peroxide value 1.9 meq. peroxide oxygen per kilogram of oil; Iodine number 111 g. of Iodine per 100 g. of oil) was mixed with the appropriate quantity of the compound(s) shown in Table 2 and the resultant solution divided into 4 equal portions which were then stored in loosely capped bottles at 40°C. At intervals representative samples (approximately 0.5 g.) were withdrawn and their peroxide value determined. From these results the time taken for the peroxide content to attain a value of 20 meq. per kilogram was estimated. In Table 2 the values shown are the averages of the individual determinations for each composition. Peroxide values were determined by iodimetry.

The storage stability expressed as the time in days required to attain a content of 20 meq. per kilogram of peroxide oxygen is recorded. The difference between this value and that for a sample which contained no additive is shown in the difference from blank column. In the calculated difference from blank column the storage stability in days is calculated assuming a purely additive effect of the additives included; that is the difference in storage stability achieved by each additive in the absence of the other additives is totalled (except in the case of system 17). In the difference due to synergy column the difference between this calculated value and the observed difference value for that composition is recorded.

For systems containing 3 additives alternative calculations of synergy values are possible by comparing the difference from blank value observed for the system with the three additives with that achieved with the dual system of the phenolic compound and the thiodialkanoic acid ester and that achieved with the metal deactivating acid, or alternatively that achieved with the dual system of the phenolic compound with the metal deactivating acid and that achieved with the thiodialkanoic acid ester. In composition 11 these alternative calculations give synergy values of 11.7 and 13.6 respectively, and in the case of composition 14 they give in both cases, values of at least 17.2.

In the case of system 17 the calculated difference from blank is based on the sum of the observed differences from blank for system 16 and system 5.

It will be seen that in all cases the use of the thiodialkanoic acid ester and/or metal deactivating agent in conjunction with the phenolic compound greatly improves the storage stability of rape-seed oil.

| System Ref. | Phenolic Compound (200 parts per million) | Dilauryl- (DLTP) or Distearyl- (DSTP) Thiodipropionate (200 parts per million) | Metal Deactivating Acid (100 parts per million) | Storage Stability (observed, in days) | Difference from blank (i.e. system 1) | Calculated Difference from blank | Difference Due to Synergy |
|---|---|---|---|---|---|---|---|
| 1 | none | none | none | 34.2 | | | |
| 2 | 4-methyl-2,6-di-tert. butyl phenol | none | none | 47.0 | 12.8 | | |
| 3 | 4-methoxy 2,6-di-tert. butyl phenol | none | none | 41.2 | 7.0 | | |
| 4 | 4-hydroxy methyl-2,6-di-tert. butyl phenol | none | none | 46.7 | 12.5 | | |
| 5 | none | DLTP | none | 57.7 | 23.5 | | |
| 6 | none | DSTP | none | 48.3 | 14.1 | | |
| 7 | none | none | Tartaric Acid | 29.5 | −4.7 | | |
| 8 | none | none | *EDTA | 21.2 | −13.0 | | |
| 9 | 4-methoxy-2,6-di-tert. butyl phenol | DSTP | none | 61.8 | 27.6 | 21.1 | +6.5 |
| 10 | 4-methoxy-2,6-di-tert. butyl phenol | none | Tartaric Acid | 41.1 | 6.9 | 2.3 | +4.6 |
| 11 | '' | DSTP | Tartaric Acid | 68.8 | 34.6 | 16.4 | +18.2 |
| 12 | 4-methyl-2,6-di-tert. Butyl phenol | DSTP | none | 75.3 | 41.1 | 26.9 | +14.2 |
| 13 | '' | DSTP | *EDTA | 48.2 | 14.0 | −0.2 | +14.2 |
| 14 | '' | DSTP | *EDTA | 80.0 | 45 | 13.9 | 32.1 |
| 15 | 4-hydroxy-methyl-2,6-di-tert. butyl phenol | DLTP | none | 77.3 | 43.1 | 36 | +7.1 |

—Continued

| System Ref. | Phenolic Compound (200 parts per million) | Dilauryl (DLTP) or Distearyl (DSTP) Thiodipropionate (200 parts per million) | Metal Deactivating Acid (100 parts per million) | Storage Stability (observed, in days) | Difference from blank (i.e. system 1) | Calculated Difference from blank | Difference Due to synergy |
|---|---|---|---|---|---|---|---|
| 16 | 4-hydroxy-methyl-2, 6-di-tert butyl phenol | none | Citric Acid | 47.1 | 12.9 | | |
| 17 | " | DLTP | Citric Acid | 80.8 | 46.8 | 36.4 | 10.4 |

* Ethylene diamine tetra acetic acid.

I claim:
1. A composition for stabilising fats and oils which comprises a stabilising amount of a synergistic mixture of (i) a phenolic compound of the formula

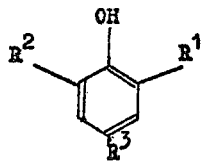

in which $R^1$ is a tertiary alkyl group having 4 to 18 carbon atoms; $R^2$ is a hydrogen atom or a tertiary alkyl group having 4 to 18 carbon atoms and $R^3$ is a methyl, ethyl or methoxy group, and if $R^3$ is a methoxy group and $R^1$ and $R^2$ are tertiary alkyl groups a compound selected from Group (ii) or Group (iii) and in the case of other compounds of Group (i) a compound from each of Groups (ii) and (iii) in which Group (ii) is a thiodialkanoic acid ester of formula $R^4OOCC_pH_{2p}SC_qH_{2q}COOR^5$ in which $p$ and $q$ are integers in the range 1 to 6, and $R^4$ and $R^5$ are aliphatic hydrocarbon groups having 6 to 20 carbon atoms, and in which Group (iii) is a metal deactivating acid or a salt thereof of which the cations are of negligible toxicity existing in only one valency state.

2. A composition as claimed in claim 1 in which $R^1$ and $R^2$ have 4 to 8 carbon atoms.

3. A composition as claimed in claim 2 in which $R^1$ and $R^2$ are tertiary butyl groups.

4. A composition as claimed in claim 1 which $p$ and $q$ are 2 or 3.

5. A composition as claimed in claim 4 in which $R^4$ and $R^5$ are alkyl groups having 12 to 18 carbon atoms.

6. A composition as claimed in claim 1 in which the metal deactivating acid is citric acid, tartaric acid, ethylenediamine tetra-acetic acid or malic acid.

7. A composition as claimed in claim 1 which comprises 4-methoxy-2, 6-di-tert.butyl phenol and a compound from each of groups (ii) and (iii).

8. A composition as claimed in claim 7 in which component (ii) and/or component (iii) are present in ratios of between 10 : 1 and 1 : 10 parts by weight based on the weight of component (i).

9. A composition as claimed in claim 1 which contains at least 1 part by weight of component (ii) and/or component (iii) for every 10 parts of component (i) and wherein component (iii) is citric acid, tartaric acid, ethylenediamine tetra-acetic acid, ortho-, meta- or pyrophosphoric acid, gluconic acid or malic acid or the non-toxic lithium, strontium, sodium, potassium, magnesium or calcium salts thereof.

10. A composition for stabilising fats and oils which comprises (i) a phenolic compound of the formula

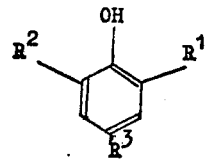

in which $R^1$ is a tertiary alkyl group having 4 to 18 carbon atoms; $R^2$ is a hydrogen atom or a tertiary alkyl group having 4 to 18 carbon atoms and $R^3$ is a methyl, ethyl or methoxy group, and if $R^3$ is a methoxy group and $R^1$ and $R^2$ are tertiary alkyl groups a compound selected from Group (ii) or Group (iii) and in the case of other compounds of Group (i) a compound from each of groups (ii) and (iii) in which Group (ii) is a thiodialkanoic acid ester of formula $R^4OOCC_pH_{2p}SC_qH_{2q}COOR^5$ in which $p$ and $q$ are integers in the range 1 to 6, and $R^4$ and $R^5$ are aliphatic hydrocarbon groups having 6 to 20 carbon atoms, and in which Group (iii) is a metal deactivating acid or a salt thereof of which the cations are of negligible toxicity existing in only one valency state, said metal deactivating acid being citric acid, tartaric acid, ethylenediamine tetra-acetic acid or malic acid and component (ii) and/or component (iii) are present in ratios of between 10:1 and 1:10 parts by weight based on the weight of component (i).

* * * * *